United States Patent [19]
Gunion

[11] Patent Number: 6,078,488
[45] Date of Patent: Jun. 20, 2000

[54] FAULT-TOLERANT ANALOG OUTPUT CIRCUIT

[75] Inventor: Allan R. Gunion, Concord, Mass.

[73] Assignee: The Foxboro Company, Foxboro, Mass.

[21] Appl. No.: 09/181,488

[22] Filed: Oct. 28, 1998

Related U.S. Application Data

[60] Provisional application No. 60/086,087, May 20, 1998.

[51] Int. Cl.[7] ................................................. H02H 3/08
[52] U.S. Cl. .......................... 361/58; 361/93.1; 361/93.9; 361/87
[58] Field of Search .................. 361/78, 58, 79, 361/86, 87, 88, 91.1, 91.2, 91.7, 93.1, 93.9, 100, 101, 18; 323/265, 273, 276, 277; 324/500, 522

[56] References Cited

U.S. PATENT DOCUMENTS

| | | | |
|---|---|---|---|
| 4,646,065 | 2/1987 | Solomon | 340/511 |
| 4,651,252 | 3/1987 | Babinski | 361/91 |
| 4,761,705 | 8/1988 | Reeves et al. | 361/93 |
| 4,937,697 | 6/1990 | Edwards et al. | 361/18 |
| 4,977,477 | 12/1990 | Babico et al. | 361/98 |
| 5,086,364 | 2/1992 | Leipold et al. | 361/18 |
| 5,233,287 | 8/1993 | Lenk | 323/268 |
| 5,285,346 | 2/1994 | Davies et al. | 361/103 |
| 5,424,898 | 6/1995 | Larson et al. | 361/101 |
| 5,650,906 | 7/1997 | Marquardt et al. | 361/88 |
| 5,654,859 | 8/1997 | Shi | 361/66 |
| 5,687,049 | 11/1997 | Mangtani | 361/18 |
| 5,710,689 | 1/1998 | Becerra et al. | 361/57 |
| 5,724,218 | 3/1998 | Tihanyi | 361/79 |
| 5,914,545 | 6/1999 | Pollersbeck | 307/131 |

*Primary Examiner*—Jeffrey Gaffin
*Assistant Examiner*—Kim Huynh
*Attorney, Agent, or Firm*—David Barron; J. J. Morris; Sean D. Detweiler

[57] ABSTRACT

A current source circuit includes a variable impedance circuit coupling the returns of dual-floating power sources, and is configured to limit maximum current output in the event of fault and facilitate detection thereof. The first power source powers the current loop using its source, with the current loop returning through the second power source's return. Control circuitry detects an increase in current beyond the predetermined maximum and appropriately increases the impedance between the first and second power sources returns to limit current provided to the current output to the predetermined maximum. This amount of current is detected by, for example, analog to digital conversion and the fault can thereby be appropriately signaled.

22 Claims, 2 Drawing Sheets

FAULT-TOLERANT ANALOG OUTPUT CIRCUIT

RELATED APPLICATION INFORMATION

This patent application is related to the copending provisional patent application entitled "Fault-Tolerant Analog Output Circuit" filed May 20, 1998, Ser. No. 60/086,087, which is hereby incorporated by reference herein in its entirety.

TECHNICAL FIELD

The present invention is directed toward current output circuitry. More particularly, the present invention is directed towards a fault-tolerant output circuit for generating a current loop control signal.

BACKGROUND OF THE INVENTION

The field of instrumentation, more particularly that of instrumentation for, for example, process control systems, utilizes an interface standard by which a 4 to 20 ma current loop control signal is used to communicate process information between devices. Some devices (e.g., process variable transmitters and control systems) send this current signal while other devices (e.g., valves and control systems) receive this signal.

In order to control the current in the loop, a variable impedance device (e.g., a transistor) is often utilized. This device is controlled such that the current in the loop is set to the desired value (e.g., 4–20 ma). Despite the particular components used to implement the circuit that controls the current, there is a finite probability that the variable impedance device therein may short, causing a drastic increase in the amount of current within the loop. If, a low impedance receiver is within the loop, an uncontrolled amount of current may flow, leading to both lost control and potential circuit damage. One example of a prior current transmission circuit is depicted in FIG. 1. Two floating power supplies, namely high-voltage supply 11 and low-voltage supply 13 power the circuit. High voltage supply 11 provides power for the current loop, while low-voltage supply 13 powers the components of the circuit.

The output current is produced by a digital to analog converter ("DAC"-selected from any type of DAC functional technology) 21 that drives a MOSFET 19, acting as a voltage to current converter (the MOSFET is the variable impedance device used to control output current). A voltage regulator 27 is connected to filter capacitor 29 and provide a voltage reference to DAC 21. Data is provided to DAC 21 through opto-couplers 25.

The output of DAC 21 drives MOSFET 19 (or other type of variable impedance element, e.g., a bipolar transistor) through a resistor 31 coupled to a filter capacitor 33 (to stabilize the output). Precision resistor 35 operates to provide a feedback signal for DAC 21.

A diode CR1 15 is optionally includable for use in redundant circuit configurations to provide secure signal clamping. In such a configuration, diode 15's anode can be tied to common in a redundant output-combining block. A diode CR2 17 provides against over voltage or reverse in the output circuit.

The circuit of FIG. 1 also includes a mechanism by which the processor controlling the circuit can read-back the present output. The read-back circuit includes analog to digital converter 23 (implemented using any type of A/D functional technology) which reads the output signal via resistor 37 and capacitor 39. Data and clocking is passed through opto-couplers 25 such that the processor controlling the system can read the current output.

The above-described circuit suffers from the aforementioned disadvantages in that a short in, e.g., MOSFET 19 will cause uncontrolled current flow, leading to both control loss and potential circuit damage. The present invention is directed toward solutions to these above-identified problems.

SUMMARY OF THE INVENTION

Briefly described, in a first aspect, the present invention includes a current source circuit having a current output. The circuit includes first and second power sources having source and return connections. The second power source is connected to control circuitry within the current source circuit. The circuit also includes a variable impedance circuit coupling the returns of the power sources. Further, the current output is in a series circuit with at least the source of the first power source and the return of the second power source.

As an enhancement, the circuit may also include a current sensing element, e.g., a resistor, in the series circuit with the current output. Further, the current sensing element may be connected to a control input of the variable impedance circuit.

More particularly and as a further enhancement, the variable impedance circuit may increase its impedance in response to a signal from the current sensing element exceeding a threshold. This threshold may correspond, e.g., to an output in excess of 20 milliamps from current output.

As further enhancements, the circuit may include a variable impedance element in the series circuit including the current output for controlling the amount of current output therefrom. This variable impedance element may be, e.g., a MOSFET and may e.g., include a control input coupled to the output of a digital to analog converter. The digital to analog converter is powered by the second power source and controls the current output. Further, the circuitry may include an analog to digital converter having an analog input coupled to a node within the series circuit for sensing the current output.

In further regard to the present invention, the first and second power sources are floating power sources. The use of the term supply and return herein shall not be limitive of the direction of current flow. That is, the terminology supply and return may refer to systems where current flows from supply to return and systems where current flows from return to supply.

In another embodiment, the present invention includes a current source circuit having a current output. The circuit includes first and second power sources, wherein the first power source provides power for at least the current output and the second power source provides power for at least some circuitry within the current source circuit. Further, a variable impedance circuit couples the current output to a return of the first power source, wherein the variable impedance circuit increases its impedance to limit the current output to a predetermined value.

In yet another embodiment, the present invention includes a method of operating a current output circuit. The method includes generating a particular current output in a range of desired outputs. The output of the circuit is limited to a predetermined maximum outside of the range of desired outputs in an event of circuit fault. If the output is at the predetermined maximum, this is detected and a fault condition is signaled. As an enhancement, the method may be executed, at least in part, by a processor. Further, the range of desired outputs may be 4 to 20 ma, while the predetermined maximum may be a value just greater than 20 ma. Also, the circuit may include two power supplies having their returns coupled by a variable impedance circuit, and the limiting may include increasing an impedance of the variable impedance circuit to limit the output to the predetermined maximum.

The present invention advantageously includes a fault-tolerant output circuit useful in generating a current output for use in generating current loop signals. In particular, the techniques of the present invention facilitate the detection of a failure within the current output circuit. This failure can be signaled such that appropriate action can be taken including, for example, switching to a replacement output circuit in a fault-tolerant configuration. The techniques of the present invention not only facilitate detection of a fault in the current output circuit, but also limit the effect of the fault in that the output current is limited by circuitry to a predetermined maximum. Thus, present invention overcomes the prior risk of excessive current output which compromised both safety and control.

BRIEF DESCRIPTION OF THE DRAWINGS

The subject matter regarded as the present invention is particularly pointed out and distinctly claimed in the concluding portion of the specification. The invention, however, both as to organization and method of practice, together with further objects and advantages thereof, may best be understood by reference to the following detailed description taken in conjunction with the accompanying drawings in which:

DETAILED DESCRIPTION OF A PREFERRED EMBODIMENT

Figure 1:
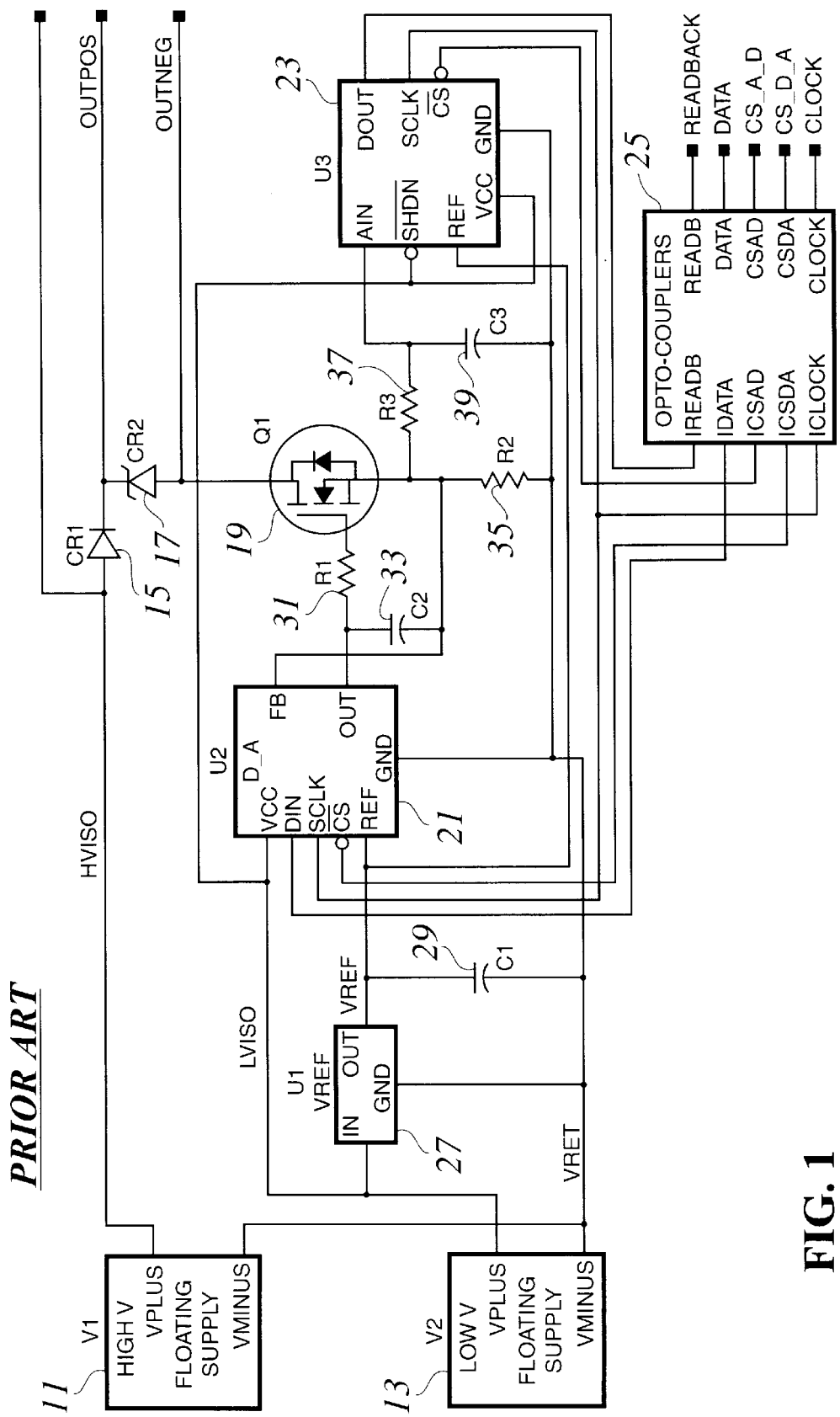
FIG. 1 is a schematic diagram of a prior art output circuit.
Figure 2:
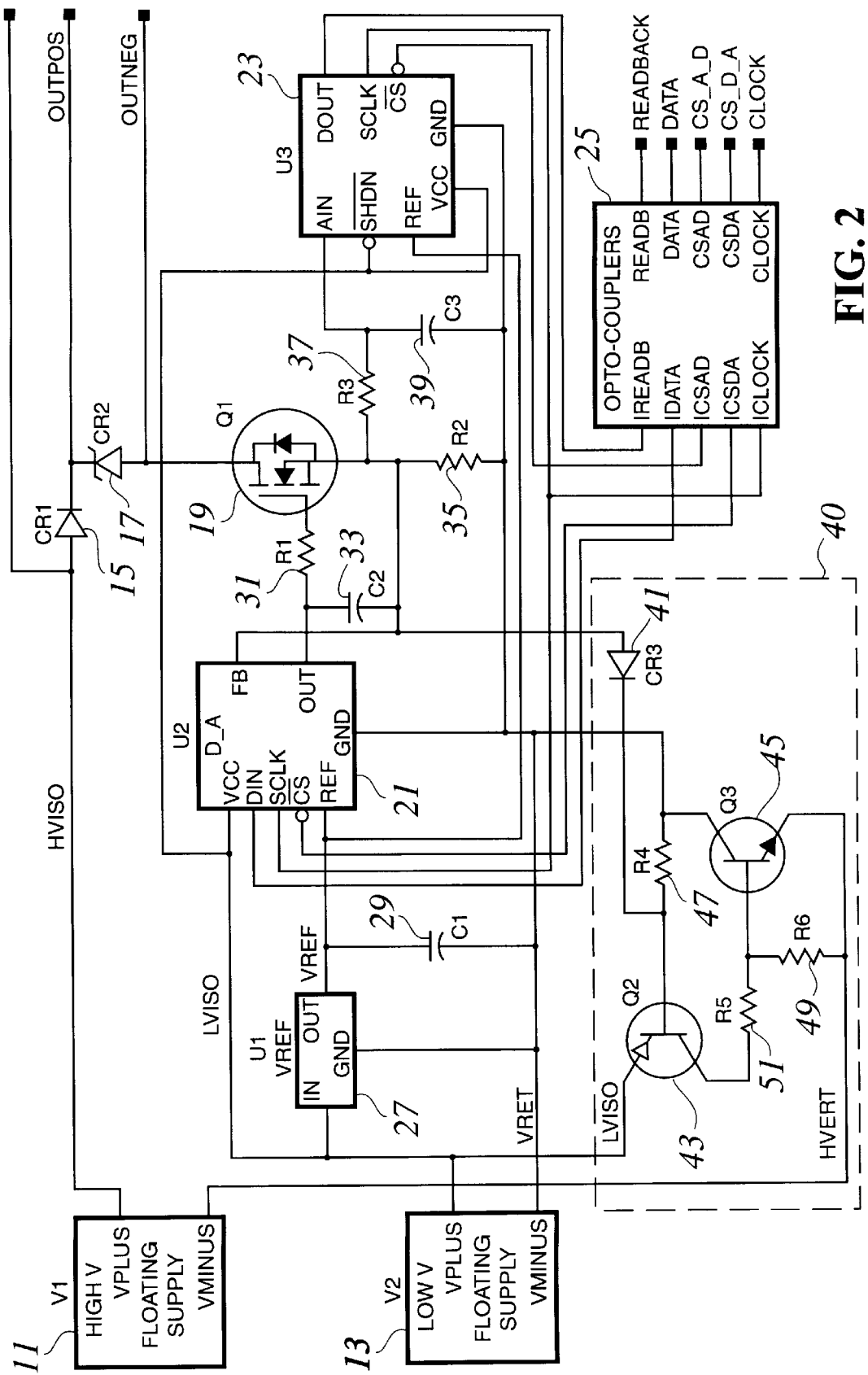
FIG. 2 is a schematic diagram of one embodiment of an output circuit pursuant to the present invention.

Depicted in FIG. 2 is a schematic diagram of an analog output circuit 9 in accordance with the present invention. This circuit shares many of the elements of FIG. 1, however it has been enhanced to facilitate a current limit on the output, slightly above a predetermined maximum. Thus, a control system, through the read-back capability, can detect when the output device has shorted. For example, in a process control configuration where the circuit has an output range of 4–20 ma, the circuit may be configured to output, for example, 21 ma when the MOSFET 19 shorts. Through read-back, the control system or processor controlling this output circuit can thereby detect when it is in a fault condition.

More specifically regarding FIG. 2, the returns of the two floating power supplies 11 and 13 have been disconnected from each other and are connected through an variable impedance circuit. The variable impedance circuit contains over-current disconnect circuit 40 includes transistors Q2 43 and Q3 45, resistors 51, 49 and 47 and diode CR3 41. Q3 45 connects the power supply returns, and is biased by the output of Q2 43 through the voltage divider including R5 51 and R6 49. Diode CR3 41 and resistor 47 provide the bias and control for Q2 43.

During normal operations, the two power supplies remain connected through the very small-saturated voltage drop of Q3. Any current flowing through sense resistor R2 35 will necessarily flow between the two-power supply returns via Q3. This will not adversely affect current output accuracy since the low side of R2 35 and the returns of voltage reference 27 and DAC 21 all use the low voltage return as a reference.

During a fault condition where, for example, the variable impedance output device (e.g., MOSFET 19) shorts, the voltage across sense resistor R2 35 will commence rising. When the voltage becomes slightly higher than the low voltage supply 13, diode CR3 41 will commence conducting current. This will cause Q2 43 and consequently Q3 45 to cease conducting current, allowing the low voltage return to float positive with respect to the high voltage return. This effectively lowers the voltage across the combination of diodes CR1 15, CR2 17 and Q1 19 to as low as necessary (including zero voltage) so as not to exceed the value of the low voltage supply across R2 35. Optionally, a small capacitance may be placed between the collector of Q2 43 and the high voltage supply return for loop stability.

More specifically, in regard to over-current disconnect circuit 40, diode CR3 41 is, for example, a small signal switching diode chosen to have V-I curves similar to that of the base emitter junction of Q2 43. At small signal levels, the two will follow very similar curves including, for example, thermal tracking. When Q3 is saturated (normal condition) resistor R4 47 is chosen to provide, for example, about four times the current needed to turn on Q2 to saturation level, and thus hold Q3 45 saturated. CR3 will carry three to four times the base current of Q2 43 to cause turn-off of Q2 and Q3.

While the invention has been described in detail herein, in accordance with certain preferred embodiments thereof, many modifications and changes thereto may be affected by those skilled in the art. Accordingly, it is intended by the appended claims to cover all such modifications and changes as fall within the true spirit and scope of the invention.

I claim:

1. A current source circuit having a current output and comprising:
    a first power source having source and return connections;
    a second power source having source and return connections and being connected to control circuitry within said current source circuit;
    a variable impedance circuit coupling said returns of said first and second power sources; and
    wherein said current output is in a series circuit with at least the source of said first power source and the return of said second power source, and said variable impedance circuit increases its impedance in response to said current output exceeding a threshold.

2. The circuit of claim 1, further comprising a current sensing element in said series circuit with said current output.

3. The circuit of claim 2, wherein said current sensing element comprises a resistor.

4. The circuit of claim 2, wherein said current sensing element is connected to a control input of said variable impedance circuit.

5. The circuit of claim 4, wherein said current sensing element sends a signal to said variable impedance circuit when said current output exceeds said threshold.

6. The circuit of claim 5, wherein said threshold corresponds to an output in excess of 20 milliamps from said current output.

7. The circuit of claim 4, wherein said variable impedance circuit includes means for limiting said current output to a predetermined value by increasing its impedance in response to said signal from said current sensing element.

8. The circuit of claim 1, further comprising a variable impedance element in said series circuit for controlling said current output.

9. The circuit of claim 8, wherein said variable impedance element comprises a MOSFET.

10. The circuit of claim 8, wherein said variable impedance element includes a control input coupled to the output of a digital to analog converter.

11. The circuit of claim 10, wherein said digital to analog converter is powered by said second power source.

12. The circuit of claim 1, further comprising an analog to digital converter having an analog input coupled to a node within said series circuit for sensing said current output.

13. The circuit of claim 1, wherein said first and second power sources are floating power sources.

14. The circuit of claim 1, wherein, independently, for each of said power sources, current flow is from said source to said return or from said return to said source.

15. A current source circuit having a current output and comprising:

first and second power sources, wherein said first power source provides power for at least said current output and said second power source provides power for circuitry within said current source circuit; and a variable impedance circuit coupling said current output to a return of said first power source, wherein said variable impedance circuit increases its impedance to limit said current output to a predetermined value.

16. The circuit of claim 15, further comprising a current sensing element in series with said current output and coupled to a control input of said variable impedance circuit.

17. The circuit of claim 15, wherein said predetermined value is greater than 20 milliamps and said variable impedance circuit prevents said current output from exceeding said predetermined value.

18. A method of operating a current output circuit comprising:

(a) operating said current output circuit to generate a particular current output in a range of desired outputs, said current output circuit including a variable impedance circuit coupling two power supply returns;

(b) preventing said output of said current output circuit from exceeding a predetermined maximum outside of said range of desired outputs in an event of circuit fault by increasing an impedance of said variable impedance circuit;

(c) detecting said output being at said predetermined maximum; and (d) signaling said fault event.

19. The method of claim 18, wherein said steps (a), and (d) are executed by a processor.

20. The method of claim 19, wherein said range of desired outputs comprises 4 to 20 ma.

21. The method of claim 20, wherein said predetermined maximum is greater than 20 ma.

22. The method of claim 19, wherein said step (c) is performed by circuitry, apart from said operation of said processor.

* * * * *